UNITED STATES PATENT OFFICE.

RANSOM C. FISHER, OF BELLEVILLE, NEW YORK.

IMPROVEMENT IN EYE-WASHES.

Specification forming part of Letters Patent No. 140,768, dated July 15, 1873; application filed October 5, 1872.

*To all whom it may concern:*

Be it known that I, RANSOM C. FISHER, of Belleville, in the county of Jefferson and State of New York, have invented a certain compound called Eye-Wash or Eye-Water, to be used for the purpose of curing weak, sore, and inflamed eyes, of which the following is a specification:

The nature of the invention of the said FISHER consists in mixing green tea, sugar of lead, white vitriol, camphor-gum, and alcohol with rain or soft water.

To prepare the eye-wash or eye-water for use, take one quart of soft cold water, and add to this one and one-half ounces of best green tea, and steep for thirty minutes, then pour off the liquid and let it settle, and when clear pour off again; add to this while it is warm one-half ounce of sugar of lead, and one-half ounce of white vitriol. After it is cool add one dram of camphor-gum well dissolved in one-half gill of alcohol. Shake well and often, and in five days it is ready for use.

The compound is to be applied with the finger or otherwise to the outside of the eyelid.

I claim as my invention—

A compound, composed of the ingredients, substantially in the proportions and for the purposes set forth.

RANSOM C. FISHER.

Witnesses:
  A. HACKLEY,
  OLIVER B. BIETS.